United States Patent [19]

Dinwoodie

[11] Patent Number: 5,316,592
[45] Date of Patent: May 31, 1994

[54] SOLAR CELL ROOFING ASSEMBLY

[76] Inventor: Thomas L. Dinwoodie, 2550 Benvenue, Berkeley, Calif. 94704

[21] Appl. No.: 938,437

[22] Filed: Aug. 31, 1992

[51] Int. Cl.$^5$ ............... H01L 31/042; H02N 6/00
[52] U.S. Cl. .................... 136/244; 136/251; 136/291; 52/173.3
[58] Field of Search .......... 136/244, 251, 291; 52/173.3

[56] References Cited

U.S. PATENT DOCUMENTS

| | | | |
|---|---|---|---|
| 3,769,091 | 10/1973 | Leinkram et al. | 136/246 |
| 4,040,867 | 8/1977 | Forestieri et al. | 136/244 |
| 4,189,881 | 2/1980 | Hawley | 52/91.3 |
| 4,321,416 | 3/1982 | Tennant | 136/244 |
| 4,674,244 | 6/1987 | Francovitch | 52/173.3 |
| 4,835,918 | 6/1989 | Dippel | 52/63 |
| 4,860,509 | 8/1989 | Laaly et al. | 52/173.3 |
| 4,886,554 | 12/1989 | Woodring et al. | 136/244 |
| 5,092,939 | 3/1992 | Nath et al. | 136/251 |
| 5,112,408 | 5/1992 | Melchior | 136/251 |

*Primary Examiner*—Aaron Weisstuch

[57] ABSTRACT

A solar cell roofing assembly (10) consists of a roofing membrane (12), a plurality of insulation blocks (14, 16, 18, 20, 22) disposed as a layer on top of the roofing membrane (12), and a plurality of photovoltaic modules (24, 26, 28, 30, 32) disposed as a layer on top of the insulation blocks. In a second embodiment, the photovoltaic modules (24, 26, 28, 30, 32) are bonded to the top surface of the insulation blocks (14, 16, 18, 20, 22) to form a shop-assembled, 2-layer integral solar roofing module. The photovoltaic modules serve the purpose of electric generator, and in addition, the multiple purposes of ballast, UV blocker, and weather protector for the insulation block and roofing membrane below. The insulation blocks (14, 16, 18, 20, 22) have interlocking side surfaces. The photovoltaic modules (24, 26, 28, 30, 32) are electrically connected edge to edge. Rainwater flows over the top of the photovoltaic modules and between the joints separating the insulation blocks, and thereby passes through to the surface of the roofing membrane (12) below. The insulation blocks (14, 16, 18, 20, 22) can be tapered, with one side edge extending higher than the opposite side edge, so that the photovoltaic modules (24, 26, 28, 30, 32) can be oriented toward a plane which is relatively normal to the incident solar radiation.

7 Claims, 2 Drawing Sheets

SOLAR CELL ROOFING ASSEMBLY

FIELD OF THE INVENTION

This invention generally relates to a solar cell roofing assembly, and in particular the invention relates to a solar cell roofing assembly having a roofing membrane protected by modules which incorporate photovoltaic cells.

DESCRIPTION OF THE PRIOR ART

One conventional roofing assembly found in many parts of the world today is a protected membrane roofing (PMR) system. In the PMR system, an insulation and ballast layer are situated above a roofing membrane, and protect that membrane. In the PMR assembly, rainwater passes past the ballast and insulation layers to flow over the membrane below.

As the cost of solar cells declines, the non-solar cell components necessary for a functioning photovoltaic system may come to dominate the overall system costs. Therefore, there is a growing trend to consider solar devices which are designed as integral building assemblies. An integral solar cell roofing system can avoid the cost of purchasing or renting land, and/or constructing a support structure for the solar cell array. A further savings is achieved when the solar cell roofing system displaces the need for purchasing and installing conventional roofing components. Due to the extreme sensitivity of future photovoltaic markets to photovoltaic system costs, a key objective in developing a solar cell roofing system is to eliminate non-essential costs and components, in part by designing components to perform multiple functions.

A prior art solar roofing assembly is shown in U.S. Pat. No. 4,886,554 issued Dec. 12, 1989. This prior art assembly includes a plurality of insulation blocks disposed as a layer on top of a roofing membrane, a plurality of pavers disposed as a layer on top of the plurality of insulation blocks, and a plurality of photovoltaic cells, each supported on a respective paver. A key component of this prior art is the supporting paver. However, by incorporating the paver, this prior art suffers from several disadvantages:

a) the prior art is more complicated than necessary, and costly to manufacture.

b) the prior art has multiple modes of potential failure, which include the paver component and its means of bonding. These components will be subjected to 20–30 years of an exposed and harsh weather environment. Any form of delamination is unacceptable. Delamination would cause dislocation of solar cells due to wind loading, and potential exposure of the insulation and membrane layers below.

Other patents related to a roofing assembly include U.S. Pat. Nos. 4,189,881 issued Feb. 26, 1980; 3,769,091 issued Oct. 30, 1973; 4,040,867 issued Aug. 9, 1977; 4,321,416 issued Mar. 23, 1982; 4,674,244 issued June, 1987; 4,835,918 issued June, 1989; 4,860,509 issued Aug. 29, 1989; 5,092,393 issued March, 1992; 5,112,408 issued May, 1992; and 4,189,881 issued Feb. 26, 1980.

None of these prior art patents refer to a protected membrane roofing system incorporating photovoltaic cells.

SUMMARY, OBJECTS, AND ADVANTAGES

According to the present invention, a solar cell roofing assembly is formed with 3 portions. One portion consists of a conventional roofing membrane installed over conventional roof framing. A second portion is a factory assembled module consisting of a photovoltaic module bonded directly to an insulation block. The insulation block has interlocking side surfaces. No paver is included in this module, as it is in the prior art. By properly constructing the photovoltaic module, the paver can be fully eliminated. The photovoltaic module performs the multiple functions normally provided by the paver, including ballast, UV protection, and weather protection for the insulation and membrane layers below.

A third portion is a conventional roofing paver, with similarly interlocking side surfaces. The solar module portion is situated over the roofing membrane in a manner to be exposed to solar radiation and electrically connected for transport of electricity. The paver portion is situated over the same membrane so as to provide walkways between aggregate areas of solar modules, and to provide perimeters around roof penetrations and equipment. Together the three portions serve the dual function of an ordinary protected membrane roofing system and an array of solar cells for the collection of radiant energy.

Several objects and advantages of the present invention are:

a) to provide a simple and low-cost solar cell roofing assembly, where components within the product provide multiple functions as follows:

1) the solar module provides multiple functions as a roofing components including ballast, weather protection, and UV protection for the insulation and waterproof membrane below, and 2) the insulation layer provides a means for increasing the average operating temperature of the solar cell, thereby increasing the solar module operating efficiency where the solar cells of the module are amorphous silicon type. This is due to a widely known, positive relationship between cell operating temperature and operating efficiency for amorphous silicon solar cells.

b) to provide a low-cost assembly by mounting the photovoltaic module directly to the insulation block, thus eliminating the integral paver.

c) to provide a solar roofing assembly which enjoys ease of fabrication due to its simple construction.

d) to provide a product with minimal modes of potential failure.

e) to provide a product that is similar in construction to an existing commercial roofing assembly to facilitate acceptance by the market and by the construction trades.

f) to provide a product that is easy to install and displaces the costs of installing conventional roofing.

g) to provide a roofing system which yields social benefits by making solar cell technology more cost competetive. This facilitates transition to a clean, renewable energy economy, and helps to mitigate air pollution and global warming.

BRIEF DESCRIPTION OF THE DRAWINGS

The foregoing and other objects, advantages and novel features of the invention will be more fully apparent from the following description when read in connection with the accompanying drawings in which.

DETAILED DESCRIPTION

Figure 1:
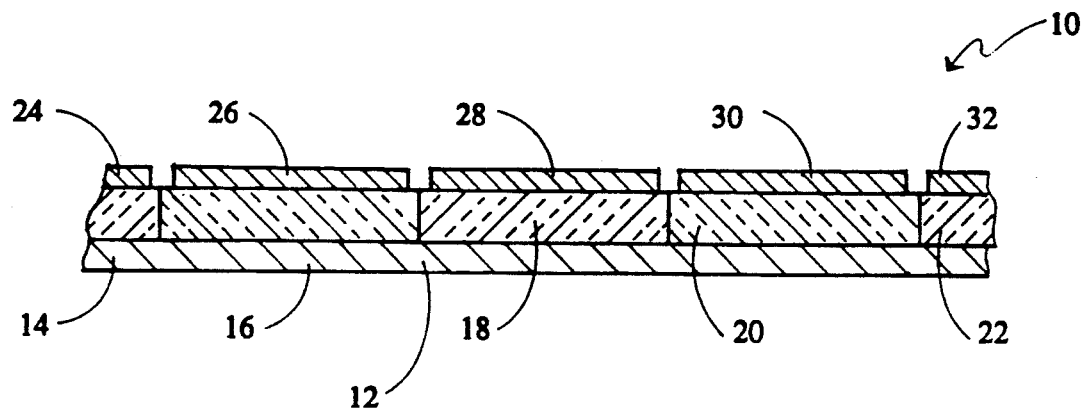
FIG. 1 is a sectional view of a solar cell roofing assembly according to the invention.

FIG. 1 shows a sectional view of a solar cell roofing assembly 10. Assembly 10 includes a roofing membrane 12, a plurality of insulation blocks 14, 16, 18, 20, 22, which are disposed on top of the membrane 12, and a plurality of photovoltaic modules 24, 26, 28, 30, 32, which are respectively disposed on top of the plurality of insulation blocks 14, 16, 18, 20, 22 and integral therewith, or fixedly connected thereto.

Membrane 12 is supported on conventional roof framing (not shown), and attached thereto by conventional methods. Insulation blocks 14, 16, 18, 20, 22 are loose laid on membrane 12. Modules 24, 26, 28, 30, 32 are connected to conventional conductors (not shown) and are arranged in an array of modules. Each of the modules 24, 26, 28, 30, 32 has at least one photovoltaic unit.

Figure 2:
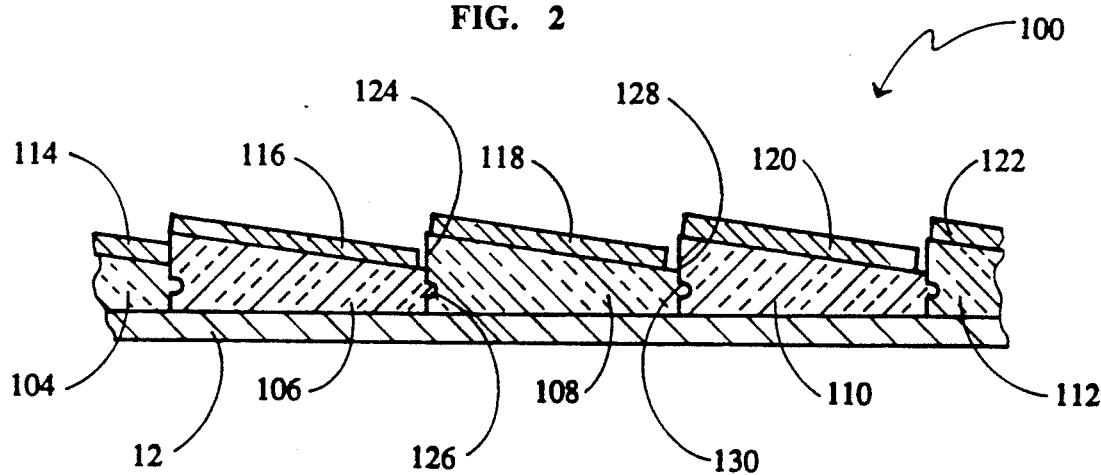
FIG. 2 is a sectional view of a second embodiment of a solar cell roofing assembly according to the invention.

FIG. 2 shows a second embodiment of a solar roofing assembly 100. Assembly 100 includes a roofing membrane 12 and a plurality of tapered, interlocking insulation blocks 104, 106, 108, 110, 112. Assembly 100 also includes a plurality of photovoltaic modules 114, 116, 118, 120, 122, which are integral therewith.

Figure 3:
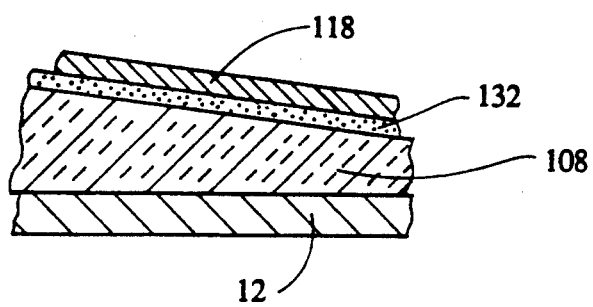
FIG. 3 is an enlarged portion of FIG. 2.

FIG. 3 shows an expanded view of insulation block 108, which is identical in construction to insulation blocks 104, 106, 110, 112, and has a top adhesive layer 132 for bonding or laminating module 118 thereto in the shop. However, any system can be used for attaching the module 118 to the insulation block. Adhesive layer 132 has an exaggerated thickness for ease of illustration. Module 118 may or may not include a conventional solar module protective backing and may utilize insulation block 108 to provide a protective backing.

Figure 4:
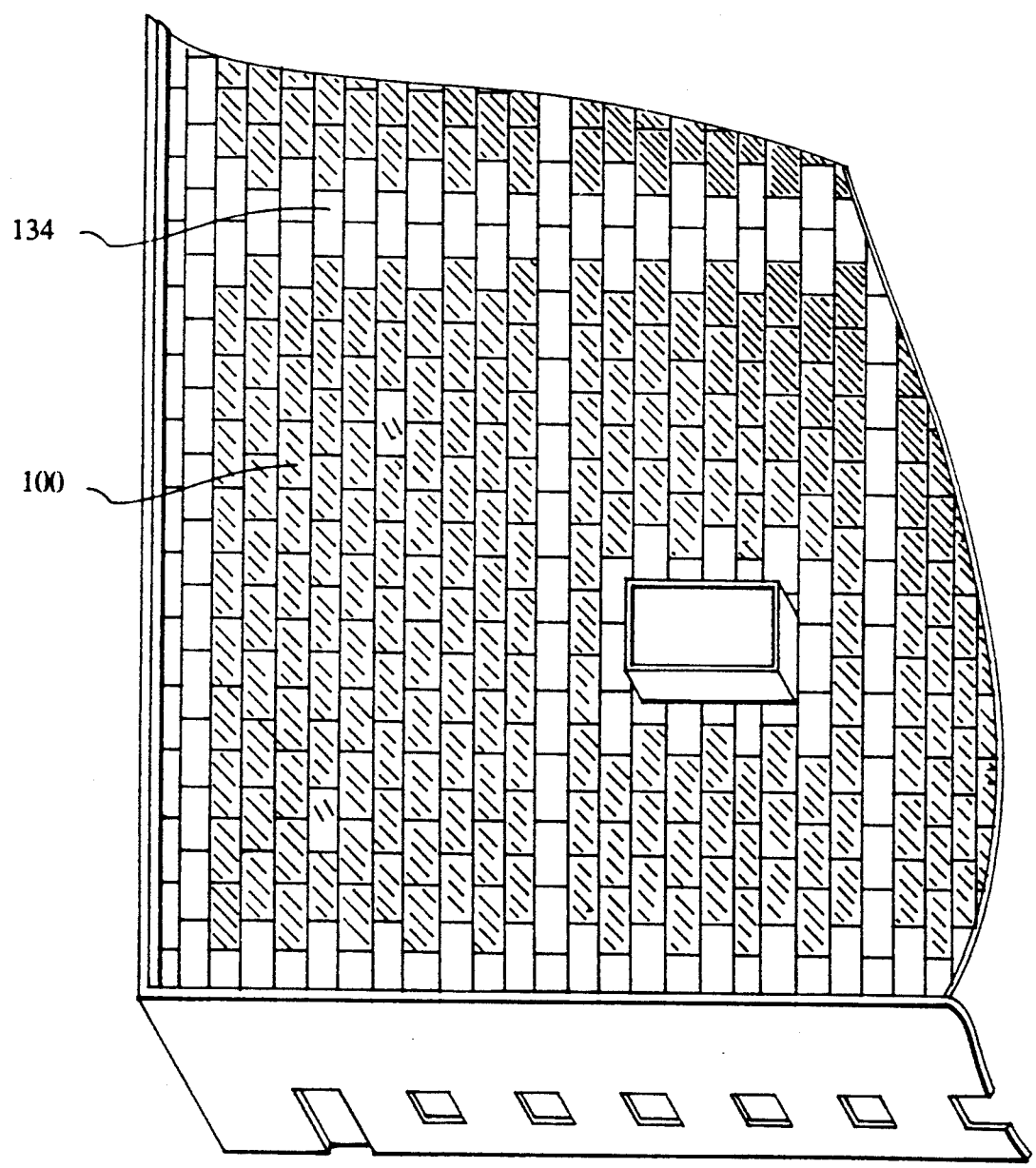
FIG. 4 is a perspective view of a building with a solar cell roofing assembly installed according to the invention.

FIG. 4 shows a perspective view of assembly 100 situated on a building rooftop. Conventional roofing pavers 134 are situated between predetermined areas of assembly 100 to provide walkways and perimeters around roof penetrations, such as vents, and around roof equipment, such as heating, ventilating, and air conditioning equipment.

In the manufacture of assembly 100, photovoltaic modules 114, 116, 118, 120, 122, are added to, bonded to, or otherwise attached to, respective insulation blocks 104, 106, 108, 110, 112 in the shop or manufacturing plant.

Insulation block 108, which is identical to blocks 104, 106, 110, 112, preferably has a left side surface 124 with a groove 126, and has a right side surface 128 with a tongue 130. In this way, interlocking joints are formed between insulation blocks 104, 106, 108, 110, 112 for better resistance to wind uplift.

The preferred method of manufacture of solar roofing assembly 100 is indicated hereafter. In FIG. 2, the typical insulation block 108 is bonded or otherwise attached on its top surface to the photovoltaic module 118 in the shop, before shipment to the field or site of construction, thereby forming a shop-assembled, two-layer roofing module. The photovoltaic module 118, together with insulation block 108, are constructed with pre-determined weight characteristics such that the integral unit provides ballast resistance to wind uplift.

In the field, the roofing membrane 12 is installed. Then, the shop-assembled module subassembly is installed as a layer over the roofing membrane. When installing the shop-assembled modules in the field, the joints between the modules are arranged in parallel straight lines.

Such construction results in a simple, readily assembled roofing module, to be used in an efficient, field-assembled roofing system. Rain water will drain through the joints between the integral modules, onto and over the roofing membrane below.

The advantages of assembly 100 are indicated hereafter.

1. Solar module assembly 100, which can be used on a flat or mildly sloping roof, minimizes water leakage through the roof.

2. Photovoltaic modules 114, 116, 118, 120, 122, when placed on insulation blocks 104, 106, 108, 110, 112, operate at relatively high efficiency when they are of amorphous silicon type, due to a positive relationship between increased operating temperatures and increased cell efficiency for amorphous silicon solar cells.

3. Inclined photovoltaic modules 114, 116, 118, 120, 122 operate at a relatively high efficiency, due to their top surfaces being close to a plane normal to solar radiation.

4. Interlocked insulation blocks 104, 106, 108, 110, 112 prevent dislodging of individual blocks, because each block is held in place by its adjoining blocks.

5. The cost of installation of assembly 100 is minimized by using the shop-assembled integral block, which includes upper photovoltaic module 118 and lower insulation block 108.

6. The solar roofing modules, consisting of photovoltaic modules 114, 116, 118, 120, 122, bonded to insulation blocks 104, 106, 108, 110, 112, are reuseable. They can be disconnected and reassembled onto other rooftops.

While the invention has been described in its preferred embodiments, it is to be understood that the words which have been used are words of description rather than limitation and that changes may be made within the purview of the appended claims without departing from the true scope and spirit of the invention in its broader aspects.

SUMMARY, RAMIFICATIONS, AND SCOPE

The present invention provides a simple, efficient, quickly installed, reuseable, and low-cost solar module assembly for roofs or other flat or mildly sloping surfaces.

While the above description contains many specificities, these should not be construed as limitations on the scope of the invention, but rather as an exemplification of one preferred embodiment thereof. Many other variations are possible.

For example, the integral solar module unit consisting of a solar module bonded to insulation block can be utilized independent of a roofing membrane.

As a further example, the integral solar module portion may include an additional layer disposed between the insulation block and photovoltaic module, which layer may provide additional thermal barrier to limit the operating temperatures seen by the insulation block and/or membrane below. The additional layer may also provide protection from ultraviolet radiation of the insulation and/or membrane layers below.

As a further example, the photovoltaic module need not be bonded to an insulation block, and may rest directly atop the roofing membrane. In this case, the roofing membrane itself may or may not provide a thermal barrier for the structure below.

I claim:

1. A solar roofing assembly, comprising:

a roofing membrane;

a plurality of insulation blocks disposed as a continuous layer on top of the roofing membrane; and a plurality of photovoltaic modules disposed as a layer directly on top of the plurality of insulation blocks, whereby the photovoltaic modules serve as ballast for the insulation and membrane layers below.

2. The assembly of claim 1, wherein each insulation block has a top surface which is bonded to its respective photovoltaic module, forming a two-layer integral block.

3. The assembly of claim 2, wherein each pair of insulation blocks with adjoining side surfaces has a joint disposed between the surfaces for water drainage.

4. The assembly of claim 3, wherein each insulation block is a tapered insulation block, and the photovoltaic module disposed above the insulation block has a top surface which can be installed so as to face in a direction of increased sun exposure.

5. The method of making a solar module assembly, including:

shop assembling an insulation block directly bonded to the bottom surface of a photovoltaic module, thereby forming a two-layer integral unit.

6. The method of claim 5, including installing in the field a roofing membrane; installing in the field the shop-assembled two-layer units as a layer on top of the roofing membrane.

7. The method of claim 6, including positioning the two-layer units in the field in substantially straight lines with their photovoltaic modules facing in a direction of maximum sun exposure.

* * * * *